(12) United States Patent
Hawkins

(10) Patent No.: US 9,489,530 B2
(45) Date of Patent: Nov. 8, 2016

(54) METHODS AND APPARATUS FOR ANONYMISING USER DATA BY AGGREGATION

(75) Inventor: Siavash James Joorabchian Hawkins, Kent (GB)

(73) Assignee: Good Technology Corporation, Sunnyvale, CA (US)

( * ) Notice: Subject to any disclaimer, the term of this patent is extended or adjusted under 35 U.S.C. 154(b) by 0 days.

(21) Appl. No.: 13/299,304

(22) Filed: Nov. 17, 2011

(65) Prior Publication Data

US 2013/0132473 A1    May 23, 2013

(51) Int. Cl.

| | |
|---|---|
| G06F 15/16 | (2006.01) |
| G06F 21/62 | (2013.01) |
| G06Q 30/06 | (2012.01) |
| G06F 21/10 | (2013.01) |
| G06Q 10/10 | (2012.01) |
| H04L 12/58 | (2006.01) |

(52) U.S. Cl.
CPC ........... *G06F 21/6218* (2013.01); *G06F 21/10* (2013.01); *G06F 21/6254* (2013.01); *G06Q 10/107* (2013.01); *G06Q 30/0615* (2013.01); *H04L 51/34* (2013.01)

(58) Field of Classification Search
CPC .. G06Q 30/02; G06Q 30/0615; H04L 67/22; G06F 21/10; G06F 21/6218; G06F 21/6254
USPC ................................................ 709/204–207
See application file for complete search history.

(56) References Cited

U.S. PATENT DOCUMENTS

| 6,496,931 | B1 | 12/2002 | Rajchel et al. | |
|---|---|---|---|---|
| 8,122,085 | B2 * | 2/2012 | Midgley | 709/206 |
| 8,181,195 | B2 * | 5/2012 | Sardera | 725/14 |
| 8,494,867 | B2 * | 7/2013 | Rosato et al. | 705/1.1 |
| 8,495,065 | B2 * | 7/2013 | Petersen et al. | 707/737 |

(Continued)

FOREIGN PATENT DOCUMENTS

| WO | WO 01/69483 A2 | 9/2001 |
|---|---|---|
| WO | WO 2009/139650 | 11/2009 |

OTHER PUBLICATIONS

International Search Report and Written Opinion, International Application No. PCT/EP2012/072763, dated Mar. 4, 2013, International Searching Authority European Patent Office.

*Primary Examiner* — Chirag R Patel

(74) *Attorney, Agent, or Firm* — Fish & Richardson P.C.

(57) ABSTRACT

In one aspect of a method of anonymizing user data by aggregation, at least one server-side device receives an anonymous aggregation command from a user client device. The anonymous aggregation command includes a specification of a set of users and an action to be taken. A list of users who meet the specification in the anonymous aggregation command is generated. The list of users who meet the specification is validated as meeting at least one criterion for anonymous aggregation. The action in the anonymous aggregation command is triggered to be taken in respect of the validated list of users who meet the specification.

31 Claims, 8 Drawing Sheets

(56) References Cited

U.S. PATENT DOCUMENTS

| | | | |
|---|---|---|---|
| 2002/0077964 A1* | 6/2002 | Brody et al. | 705/38 |
| 2003/0229892 A1 | 12/2003 | Sardera | |
| 2006/0143278 A1 | 6/2006 | Bauchot | |
| 2008/0133531 A1 | 6/2008 | Baskerville | |
| 2009/0247193 A1* | 10/2009 | Kalavade | 455/456.3 |
| 2010/0138499 A1 | 6/2010 | Belz et al. | |
| 2010/0197318 A1* | 8/2010 | Petersen et al. | 455/456.1 |
| 2012/0226701 A1* | 9/2012 | Singh | 707/748 |

* cited by examiner

METHODS AND APPARATUS FOR ANONYMISING USER DATA BY AGGREGATION

TECHNICAL FIELD

The present invention relates to methods and apparatus for anonymising user data by aggregation.

BACKGROUND

There are many examples where a person wants to know about activities of other people, and possibly cause some action to be taken in respect of those other people. For example, a person may want to learn at least some information concerning how other people have used or interacted with some data.

As a particular example, users often want to know who has read an email message that they sent, perhaps just for general feedback on the interest in the email shown by other users or to allow some contact to be made with those readers of the email. However, the readers are often wary of sharing this information. There are existing features, such as email read reports, but these are only sent at the reading user's option and many users will simply decline to have their reading of the message reported to the sender (for any of a number of reasons, including privacy). Some other examples are document files stored in a shared location within a company, pages on a company's intranet wiki, and even pages on a public website such as Wikipedia for example. The list of users who have edited a shared company document or intranet wiki page is often available to anyone in the company. Similarly, the list of users who have edited a page on a public wiki is generally visible. However, there is generally no information available about who has read a shared document or wiki page or the like. As yet another example, users might also like to contact other users who are working on projects similar to their own, or who have similar interests or competencies. This could be assessed by checking the subject lines of email messages that other users are sending. However, again, the other users will typically be unwilling to have this information made generally available, even within their own organisation.

SUMMARY

According to a first aspect of the disclosure, there is provided a method of anonymising user data by aggregation, the method comprising at least one server-side device:
  receiving an anonymous aggregation command from a user client device, the anonymous aggregation command including a specification of a set of users and an action to be taken;
  generating a list of users who meet the specification in the anonymous aggregation command;
  validating the list of users who meet the specification as meeting at least one criterion for anonymous aggregation; and
  triggering the action in the anonymous aggregation command to be taken in respect of the validated list of users who meet the specification.

Embodiments of the present disclosure provide information concerning user data, such as personal data concerning the users or, more typically, the subjects of users' activities, in an aggregated and anonymous form, and allows an action to be taken in respect of those users, subject to certain safeguards to preserve the users' privacy. As just one example, an action such as sending an email to all of the users can take place without removing the anonymity of those users (i.e. without those users being identified to the user of the client device initiating the process). The information that is presented in aggregated form need not ever have been in a single, central location. For example, in an embodiment, a distributed system supports queries that are made anonymous by aggregation. The preferred embodiments thus allow for creation of aggregations of users that can be acted upon collectively by another user, without enabling the other user to act upon or contact or identify any user in the aggregation individually. In embodiments, aggregations of users that were generated on separate systems that use the same scheme of user identification can be combined without compromising the anonymity of the aggregations. Moreover, in embodiments, aggregations of users that were generated on separate systems that use different schemes of user identification can be combined, without the need for a complete mapping between the schemes, and without compromising the anonymity of the aggregation.

In an embodiment, the method comprises storing, in an event index, event information relating to events that have taken place concerning a user. The generating a list of users may comprise executing a query in the event index to retrieve the list of users who meet the specification in the anonymous aggregation command. A stored event index allows rapid access to the users who meet the specification, and can be continually assembled and added to as users of the system carry out relevant activities (such as sending emails, reading certain Web pages, reading certain shared documents, etc.).

In an embodiment, event information relating to events is stored in plural event indexes, and the generating a list of users comprises executing queries in the plural event indexes to retrieve the list of users who meet the specification in the anonymous aggregation command. At least two of the event indexes may store event information relating to different types of service. At least two of the event indexes may be stored in a distributed manner in different nodes of a network.

The method preferably comprises storing in the event index subject data concerning the subject matter of actions carried out by users. The subject data may for example be or be derived from subject lines of email messages, titles of wiki pages or documents, file names, subjects of calendar items, etc. Subjects in the index may be matched against each other. Matching need not rely on exact simple text matching, and preferably allows for at least some approximate matching, using for example a scoring system, so as to be more generally useful.

The generating a list of users may involve a list sharing method whereby lists of for example users or data or objects are stored in a distributed manner across a number of nodes in a system, and a list created by one node can be checked for common elements by another node without requiring that the other node can read the whole list.

In an embodiment, the method comprises executing a query in the event index in respect of the user of the user client device in order to validate the specification in the anonymous aggregation command for that user. For example, a user may only be given information about subjects that match with their own "positive activity". "Positive activity" in this sense could include for example one or more of organising a meeting, sending an email, writing a document, editing a wiki page, creating a task, accepting a task assignment, etc. Qualifying by positive action prevents speculative browsing of the index.

In another embodiment, the generating a list of users comprises causing a query to be issued to retrieve event information relating to events that have taken place concerning a user. This can be used instead of compiling and storing an event index as such. Instead, queries can be sent by the server-side device to some other system or systems that provide the required data relating to users, such as an email system, network access records, etc. The list of users who meet the specification may be generated from responses received to the issued queries.

In an embodiment, a query may be caused to be issued to retrieve event information relating to the user of the user client device in order to validate the specification in the anonymous aggregation command for that user.

In general, the generating a list of users may comprise executing plural queries in the event index referred to above and/or causing plural queries to be issued to retrieve event information relating to events that have taken place concerning a user as referred to above, with the results of the queries being combined in some way, for example by using set operations which are known per se.

In an embodiment, the taking the action comprises creating an object addressed to each of the users in the validated list of users. The object may for example be a notification, which is output to each of the users in the validated list of users. This may be for example an email, SMS (short message service or mobile phone "text"), etc., which is sent to each of those users. The object may in another example be or include a task for each of the users in the validated list of users, which may for example be added to their (electronic) calendars. The object may provide details of the user associated with the user client device that issued the anonymous aggregation command. This allows the user to make contact with the validated list of users who meet the specification, though without the user being provided with details of who those other users are such that for example their names, email addresses, telephone numbers, etc. are not known to the user.

In an embodiment, the taking the action comprises outputting an indication of the number of users in the validated list of users for receipt by the user client device that issued the anonymous aggregation command. This allows the user to be provided with an indication of for example how many people have read a particular email, or have read emails on a particular subject, or have accepted an invitation to attend a meeting (possibly on a particular subject).

According to a second aspect of the present disclosure, there is provided a method of triggering an action to be taken in respect of users whose data has been anonymised by aggregation, the method comprising a client-side device:
  issuing an anonymous aggregation command for receipt by a server-side device, the anonymous aggregation command including: a reference to the user on whose behalf the command is being issued; a specification of a set of users; and an action to be taken by the server-side device in respect of users who meet the specification and are validated as meeting at least one criterion for anonymous aggregation.

This provides a user with an automated client-side arrangement for causing an action to be taken in respect of a number of users who are for example deemed to be relevant to a subject but in an aggregated and anonymous form so that the user does not know the details of those users.

In an embodiment, the method comprises receiving at the client-side device data from the server-side device in respect of a validated list of users who meet the specification. In a simple example, this data might just be the number of users who meet the specification (read an email on a particular subject, read a particular document etc.), and that can be displayed to the user of the client-side device.

According to a third aspect of the disclosure, there is provided apparatus comprising one or more server-side devices for anonymising user data by aggregation, the apparatus providing a processing system constructed and arranged to:
  receive an anonymous aggregation command from a user client device, the anonymous aggregation command including a specification of a set of users and an action to be taken;
  generate a list of users who meet the specification in the anonymous aggregation command;
  validate the list of users who meet the specification as meeting at least one criterion for anonymous aggregation; and
  trigger the action in the anonymous aggregation command to be taken in respect of the validated list of users who meet the specification.

The processing system may comprise at least one processor and at least one memory including computer program code, the at least one memory and the computer program code being configured, with the at least one processor, to cause the device at least to operate as described above. The processing system may effectively be provided in a distributed manner across plural server-side devices, with one or more parts of the functionality being provided by one server-side device and one or more other parts of the functionality being provided by one or more other server-side devices.

According to a fourth aspect of the present disclosure, there is provided a client-side device for triggering an action to be taken in respect of users whose data has been anonymised by aggregation, the device comprising a processing system constructed and arranged to:
  issue an anonymous aggregation command for receipt by a server-side device, the anonymous aggregation command including: a reference to the user on whose behalf the command is being issued; a specification of a set of users; and an action to be taken by the server-side device in respect of users who meet the specification and are validated as meeting at least one criterion for anonymous aggregation.

There is also provided non-transitory computer-readable storage media comprising sets of computer-readable instructions stored thereon, which, when executed by a processing system, cause the processing system to carry out any of the methods respectively described above. There may also be computer programs comprising code such that when the computer programs are executed on a computing device, the computing device is arranged to carry out any of the methods respectively described above.

Further features and advantages of embodiment of the disclosure will become apparent from the following description of preferred embodiments of the disclosure, given by way of example only, which is made with reference to the accompanying drawings.

DETAILED DESCRIPTION

Figure 1:
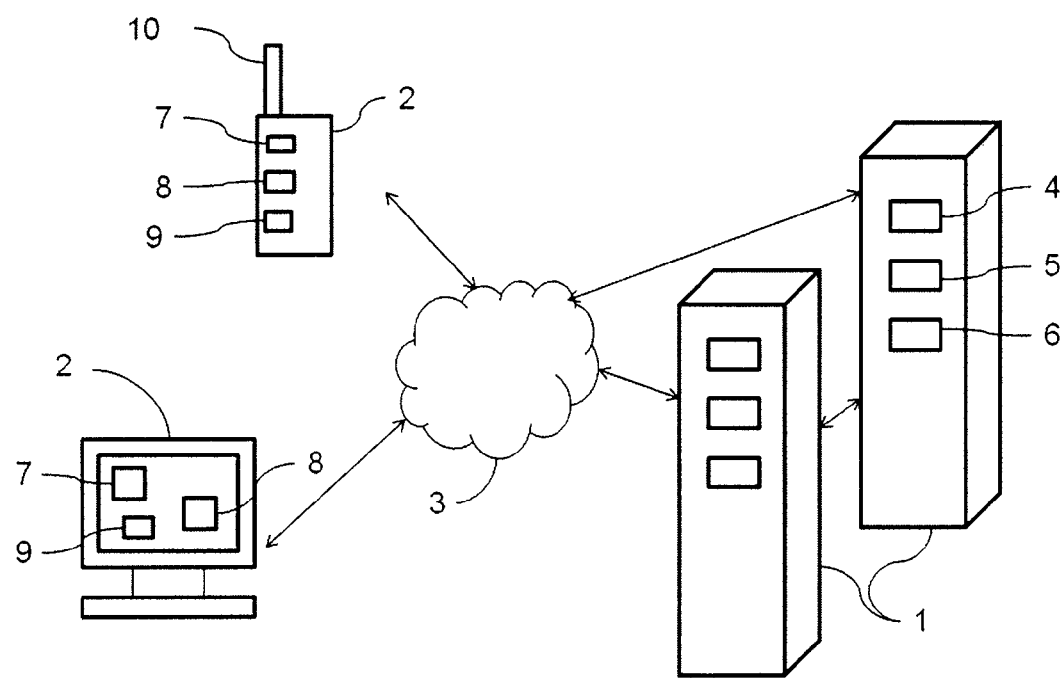
FIG. 1 shows schematically an arrangement making use of embodiments of the present disclosure.

Referring to FIG. 1, there is shown schematically an arrangement making use of embodiments of the present disclosure. One or more servers or other computing devices 1 are in communication with a plurality of user devices 2 via a network 3, which may be a local area network, a wide area network, the Internet, etc., a wireless network such as WiFi, a cellular (mobile) telephony network, etc., or combinations thereof. The servers 1 may similarly be in communication with each other, directly and/or via a network 3 as described. Each server 1 has a processor(s) 4, memory (such as random access memory or RAM) 5, non-volatile data storage area (such as one or more hard disks, solid state storage devices, etc.) 6, etc. Each user device 2 similarly has a processor(s) 7, memory 8, non-volatile data storage area 9, etc. Wireless user devices 2 (including particularly mobile devices 2) also have the necessary wireless communication equipment, including an antenna 10 for example. "Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The processors 4,7 carry out instructions under control of software stored in the data storage areas 6,9, storing and accessing data in the memory/memories 5,8 as conventional for computing devices per se.

In broad terms first, in one embodiment, a user device 2 has client software stored and running that enables a user of the device 2 to issue anonymous aggregation commands (either "manually", i.e. at the instigation of the user, or automatically) which are sent over the network 3 to the server(s) 1 to be acted upon by the server(s) 1. The commands include a reference to the user on whose behalf the command is being issued, i.e., they identify that user. The user determines a specification of the set of users that are to be deemed pertinent for this command and also an action to be taken towards the set of users who meet the specification, and the command includes corresponding data and/or instructions for the server(s) 1. The client software can be part of a dedicated anonymous aggregation application, running on the user device 2 separately of other running software or applications, in which case commands would be sent in response to user action, and results would be displayed in the dedicated anonymous aggregation application. Alternatively, the client software can be running as part of or integrated into some other software or application, for example an email application. In that case, commands could be sent in background, with the display of results being integrated into the main application's user interface.

The servers 1 store and run appropriate server-side software. When one of the servers 1 receives an anonymous aggregation command issued by a user device 2, the server 1 can interface with a subset generator to process the command. A subset generator interfaces with an event index which stores information about events that have taken place in a primary system. The primary system may be one of many types, including for example an email sever, a personal information management server, a calendar server, a wiki host, etc. The event index supports queries on the data that it stores. Instead of there being an event index, an event index virtualiser may be used, as discussed further below. The subset generator and event index generate a list or lists of users who meet the specifications in the aggregation set. The list or lists are validated to determine whether the final result set qualifies as an anonymous aggregation. The subset generator can interface with a subset addresser to execute the action, which was specified in the command sent by the user device 2, towards or in respect of the users in the final result set.

There can be multiple subset generators, event indexes/event index virtualisers and subset addressers. The components can be organised in an anonymous aggregation network, spread across plural servers 1. The plural servers 1 of an anonymous aggregation network can process anonymous aggregation commands in a similar way to that outlined above and can distribute the processing without compromising anonymity.

Figure 2:
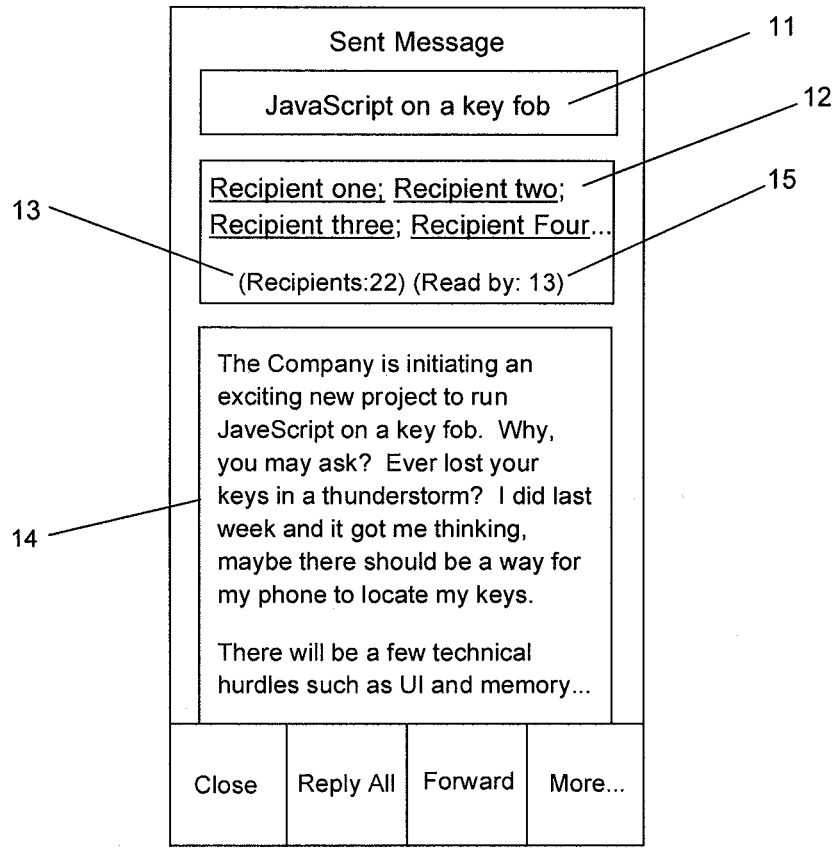
FIG. 2 shows an example of an interface or display provided on a user device in accordance with an embodiment of the present disclosure.

Examples of embodiments of the present disclosure provide a user with feedback on an email they have sent. For example, the sender of an email message to ten recipients can see a count of how many of the ten have read the message, and can for example see how many people read the message on any given day. However, the sender is not informed which of the ten recipients has read the message and also cannot find out which of the ten recipients has not read the message. Thresholds may be set. For example, in an embodiment, the sender of an email message to a small number of recipients does not get access to any counts of readers or the like, to help avoid the sender being able to work out who may or may not have read the email. An example of this is shown schematically in FIG. 2, which shows an example of an interface or display provided on a user device 2 by the client software. Here, the user has sent an email and is viewing the sent email as provided by the client software. In addition to the usual items such as title or subject 11 of the email, list of the addresses or recipients 12, total number of recipients 13, text of the message 14, in an embodiment of the present disclosure, there is also displayed a count of the number 15 of recipients who have actually read the email (though there no indication of which particular individuals have actually read the email).

Figure 3:
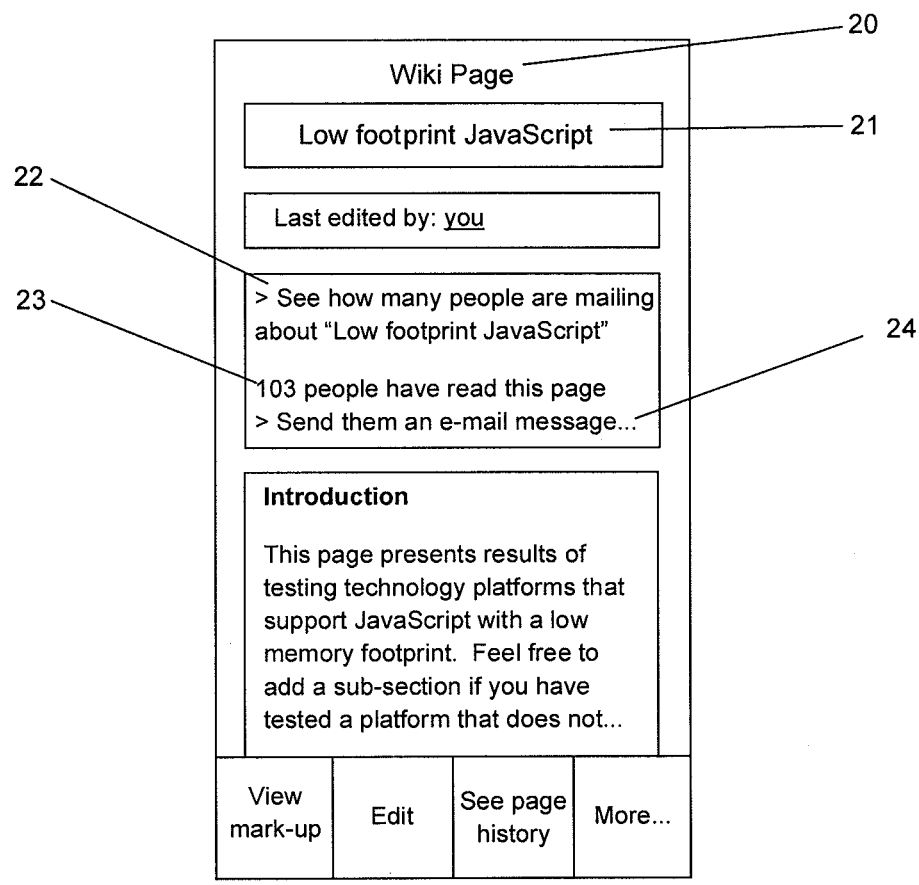
FIG. 3 shows another example of an interface or display provided on a user device in accordance with an embodiment of the present disclosure.

As another example, a user may want to send an email or other message relating to a particular subject to people who may be interested in that subject. In an embodiment, the message will be delivered to every user who has sent a message with the given subject, or a similar subject in some embodiments, again without the user being informed who those users are. This may be restricted to being initiated only in limited circumstances, such that a user must have to have organised a meeting that was attended by at least ten people on a subject before they can send an email relating to the subject in this way. Examples of this are shown schematically in FIG. 3, which shows another example of an interface or display provided on a user device 2 by the client software. Here, the user is an editor of a wiki page 20, which is being displayed on the user device 2 and which concerns the subject "low footprint Javascript" 21. The user has an option 22 (displayed as a "clickable" icon on the user device 2) to have a command issued by the user device 2 to learn how many people have sent emails concerning "low footprint Javascript". The user is also presented with a display 23 of the number of readers of that wiki page, which is provided as the result of an anonymous aggregation command, which may have been sent automatically when the user opened the wiki page to edit it, or when saving the edits, for example. The display on the user device 2 can also include a clickable icon 24 which can be "clicked" in order to initiate a further related command, such as sending by the user of an email to each of those readers of that wiki page.

As another example, a user organises a meeting and sends invitations. In an embodiment, when enough people have accepted invitations, a number of counts are displayed to that user on their client-side device. For example, the organiser can see a count of how many messages related to the meeting's subject have been sent by confirmed attendees. As another example, the organiser can see a count of attendees who have created tasks that are related to the subject of the meeting. As yet another example, the organiser can see a count of attendees who have read a wiki page that is linked from the invitation. Many other examples of relevant information that can be provided to the organiser are possible.

In exemplary embodiments, a number of thresholds may be applied. For example, there may be a minimum number of recipients for an email before reading the email can qualify as a positive action. As another example, there may also be a threshold for the minimum number of actions required for a meaningful aggregation. As a simple example, if an email is sent to only two people, it may be decided that the anonymity of the recipients cannot be properly preserved if that email is subject to indexing and the action of the two recipients notified back to the sender.

A threshold of particular importance in many practical implementations is concerned with ensuring that the final result set of users who meet the specification in the anonymous aggregation command actually qualifies as an anonymous aggregation. For example, there may be required to be a minimum number of users in this set, such as at least two users and, more generally though without limitation, some value between 2 and 20 users say. As another example, the minimum number of users in the set in order for that to qualify as an anonymous aggregation may be a certain portion or percentage of the total number of users involved with the network or system (i.e. those users giving rise to events for which event information is stored in a specific example say). This may be the total number of users in an enterprise (such as a business, or university or school, etc.) and the minimum number may be a percentage of that for example, such as 1%, 2% or some other (typically quite small value) between say 1% and 10% or so. It will be understood that the preferred or optimal value will depend on a number of factors, including for example whether the users are in the same or related organisations, might actually know each other personally, are located geographically close to each other, etc. Another possible factor is the degree of confidence required by the users or enterprise or other organisation that their anonymity is actually being protected. Some organisations may require this to be strictly the case and therefore require the minimum to be set at a high level, whereas other organisations may be less stringent, and indeed wish to encourage communications say between users, and so may set a lower threshold. Another factor is the nature or type of data involved, which may cause the organisation or enterprise to seek a higher or lower threshold. The number would typically be set at a network level, taking into account for example the total number of users concerned.

In exemplary embodiments, passive actions are added to the index. Passive actions include for example reading an email, reading a wiki page, reading a document, etc. It may be noted that for these purposes, merely receiving an email preferably does not count as a passive action and would not be added to the index.

Figure 4:
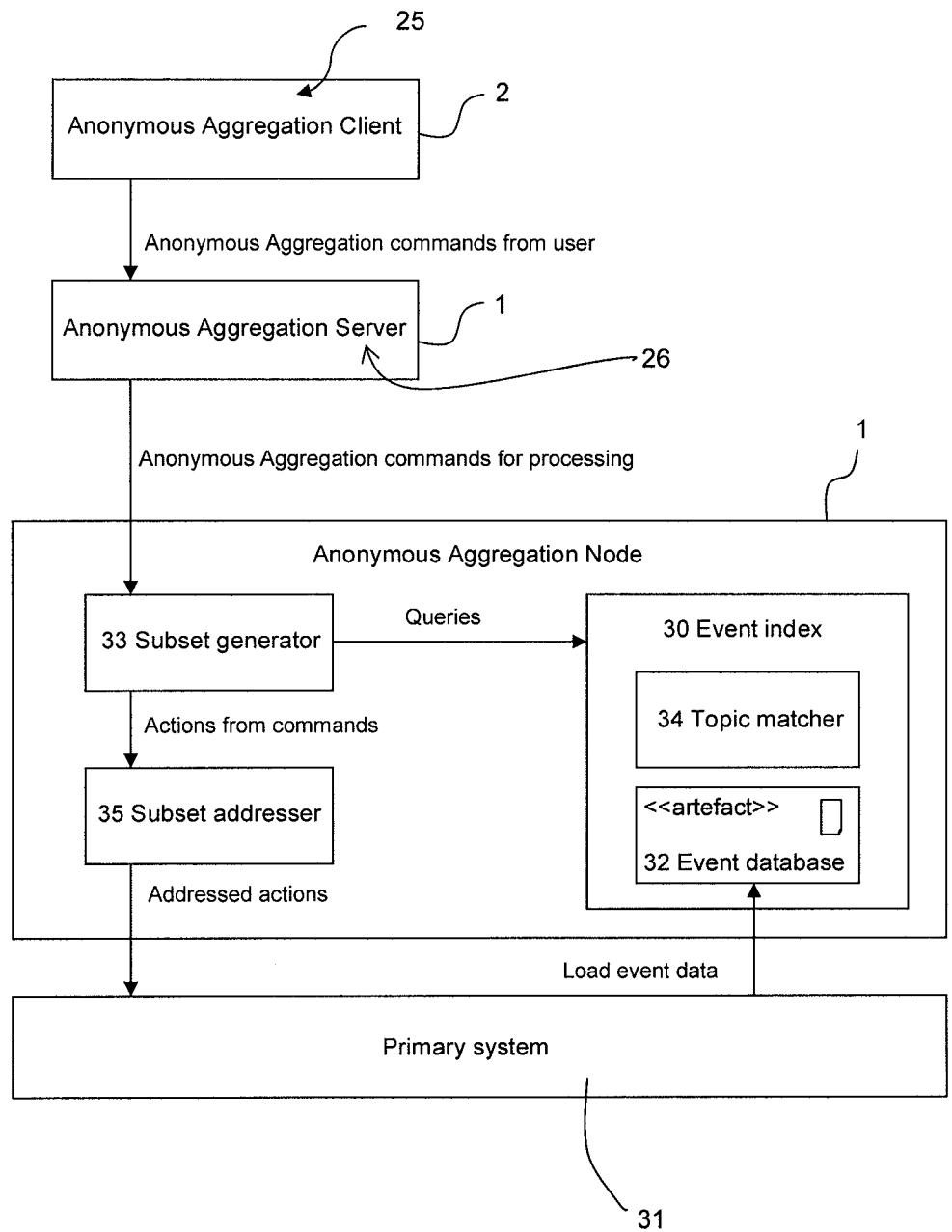
FIG. 4 shows schematically an overview of examples of interaction between a client, a server, a node and a primary system in accordance with an embodiment of the present disclosure.

Referring now to FIG. 4, there is shown a client device 2 running appropriate client-side software 25 which can send anonymous aggregation commands to the anonymous aggregation server 1 where the commands are acted upon by appropriate server-side software 26. In this example, the anonymous aggregation server 1 passes the commands for processing to a further server 1, some times referred to herein as an anonymous aggregation node 1. Again, it will be understood that plural servers or nodes 1 can be used in practice, with data being stored at and processing being carried out at different ones of the servers/nodes 1 in a distributed manner.

The event index 30 mentioned above is formed by the node 1 receiving event information from some "primary system" 31, such as an email and personal information management (PIM) server, a wiki host, document management system, etc., and storing that in an event database 32. (It will be understood that PIM typically includes contacts, calendar, tasks and sometimes memos.) So, for example, the node 1 receives from an email server 31 details relating to emails that have been sent by users, the details including for example the date and time the email was sent, contact details for the sender and the recipients, the subject of the message, etc. As another example, the node 1 receives from a document management system 31 details relating to documents that have been "opened" or read by users, the details including for example the date and time the document was opened or read, contact details for the sender and the users who opened or read the document, the title and file name of the document, etc. Different nodes 1 may be in communication with different primary systems 31, for example belonging to different organisations, and each node 1 may be in communication with one or more primary systems 31.

The event index 30 can support direct queries from the subset generator 33, where an item or subject reference and a type of event are specified, and the query returns a list of users to whom an event of the specified type happened with the referred item or subject. The event index 30 can also support indirect queries from the subset generator 33, where an item reference and a type of event are specified, and the query returns a list of users to whom an event of the specified type happened with an item or subject whose topic matches the topic of the referred item. The event index 30 uses a topic matcher 34 to identify matches between the subjects of events in the index(es) and the incoming anonymous aggregation command from the client 2 via the server 1 and subset generator 33. Some examples of possible subjects that can be stored in the event index for this matching are subject lines of email messages, titles of wiki pages or documents, file names, subjects of calendar items, etc. Matching of subjects may use simple exact text matching, though it is preferred that at least some method of approximate matching is used, using for example a phonetic algorithm or scoring system, such as Soundex for example, as is known per se.

In exemplary embodiments, a user is only given information about subjects that match with their own "positive activity". Positive activity in this context includes organising a meeting, sending an email, writing a document, editing a wiki page, creating a task, accepting a task assignment, etc. Merely reading an email of itself would not typically count as a positive activity in this context. Attending a meeting would count as positive, possibly because the user would have sent a response email to an invitation to attend the meeting. Qualifying by positive action in this manner prevents speculative browsing of the subjects in the index by users.

As mentioned above, rather than or in addition to the use of the event index 30 in the server 1, the subset generator 33 may interface with an event index virtualiser that presents the same interface as an event index 30 without necessarily storing data itself. Such a virtualiser queries its associated primary system 31 whenever it must process a query received from the subset generator 33. An event index virtualiser is, in effect, a mapper of data structures and queries.

Some examples of events that could appear in an event index are:
User U1 sent email message M1
User U2 read email message M1
User U3 edited wiki page P1
User U4 read wiki page P2
etc.

In an example, the following information is stored for each event:
Event type: a code for the type of the event, for example sending an email message.
Item reference: a unique reference to an item in the primary system 31. This is the item to which the event happened.
User reference: a unique reference to a user account within the primary system 31. This is the user in the event.
Item topic: the topic, or "subject", of the item, or a hash of the topic which can be matched to other topics. Note that in an example, the only use to which the topic is put is for matching against the topics in other items, and therefore a hash is sufficient. Storing a hash helps guard anonymity, by removing a piece of clear data from the event index 30 and hence from the anonymous aggregation network as a whole.

An event index 30 supports queries on this stored information.

A subset addresser 35 in the node 1 receives the output of the subset generator and executes actions specified in the anonymous aggregation commands received from the client 2, such as sending an email message to everybody in a defined aggregation. The subset addresser 35 is not associated with the event index 30 as such. It may be noted that the subset addresser 35 executes actions on behalf of an originating user, and these actions are always identified as such. For example, an email sent as the action of an anonymous aggregation command will show as being from that user to its recipients.

The aggregation specification in an anonymous aggregation command from a user device 2 can refer to a number of items in the primary system 31 whose events are stored in the event index 30. The aggregation specification in an anonymous aggregation command can specify the users in the aggregation set in terms of types of event that have occurred with referred items (i.e. an exact correspondence), or with matching items (i.e. "similar", as defined). Moreover, the aggregation specification in an anonymous aggregation command can specify set operations that combine lists of users. The subset generator 33 combines lists of users according to any set operations specified in an anonymous aggregation command, generating a final result set.

As mentioned above, the subset generator 33 validates whether the final result set qualifies as an aggregation and take no further action if it does not. The subset generator 33 and event index 30 can also carry out the check that the command's originating user has a "claim" to the items referred to in the aggregation specification of the command. For example, as mentioned above, a user may only be given information about subjects that match with their own "positive activity", such as organising a meeting, sending an email, writing a document, editing a wiki page, creating a task, accepting a task assignment, etc.

There can be multiple event indexes 30 (and/or event index virtualisers), subset generators 33 and subset addressers 35. The components can be organised in an anonymous aggregation network, which processes anonymous aggregation commands in a similar way to that outlined above. The components in the network can distribute processing without compromising anonymity, and indeed this may assist in ensuring anonymity. The event indexes 30 of an anonymous aggregation network can store event data for different types of service. An anonymous aggregation network can process anonymous aggregation commands whose aggregation specifications cover event data of different types of services in a similar way to that outlined above.

Specific examples of the operation of examples of embodiments of the present disclosure will now be described. It will be understood that many variations are possible beyond those specific examples described here.

Anonymous Aggregation Commands

The following are examples of anonymous aggregation commands which may be sent by (the client software running on) the user device 2. The client software may be arranged so that the commands are sent only when prompted (such as manually) by the user or automatically following an action taken by the user, optionally with the user being able to save certain settings and options as defaults.

1. Where the user has sent an email message, E1, query how many of the recipients have read E1.

2. Where the user has organised a meeting, M1, query how many of the attendees have read a wiki page, W1, that the user edited.

3. Where the user has edited a wiki page, W2, with the title W2T, send an email to every other user that has themselves sent an email with a subject similar to W2T.

4. Where the user has sent an email message, E3, with the title E3T, to a substantial number of recipients, find any wiki pages with a title similar to E3T.

5. Where the user has written two wiki pages, W1 and W2, check how many people have read W1 but not read W2.

6. Where the user has sent two email messages, E1 and E2, check how many recipients have read either E1 or E2.

In a specific example, the anonymous aggregation commands are composed of the following parts:
(i) User reference: details of the user who is sending the command, if manual, or on whose behalf the command is being executed, if automatic. User references are listed in the event index, see above.

(ii) Aggregation specification: the aggregation specification defines the set of users who are in the aggregation. The aggregation specification is a set specification, as discussed further below.
(iii) Action: a symbolic code, and possibly attached content, for the action to be taken with regard to the users who are found to be in the specified aggregation. Subset addressers map the codes to actions and process any attached content accordingly. For example, the action may simply be the return of the number of users who have read a particular email or email concerning a particular subject, read a particular wiki page, etc. As another example, the "Send mail" code with an email message attachment would cause the attached message to be sent to each of the users in the resulting aggregation. Another example would be to assign those users a task within the enterprise PIM system. As another example, the action may be simply to return to the user the number of other users who have read an email or a wiki page or the like, or attended a meeting on a particular subject, etc. As discussed further below, in some cases at least, if for example the aggregation is found to be too small or too large, then the action may not be taken.

Set specifications are used to define the membership of an aggregation. Every command contains a set specification.

In an example, a set specification can be of one of two types, namely a list specification or an expression specification.

A list-type specification defines a list of users in direct terms, such that a query can be executed by an event index to generate the set. In an example, a list specification includes the following elements:
(i) Item reference: a unique reference to an item in a primary system, for example an email message. The user who is sending the command must have a claim to all the items to which their commands refer; see further below for checks made by the server 1 on this. In addition, the items must be valid in the sense that they are something that can be validly referred to as part of an anonymous aggregation command; see further below for checks made by the server 1 on this.
(ii) Match flag: a flag for whether the users on the list must be present in an event for the referred item itself, or for any event whose topic matches the referred item. Note that this is not necessarily an exact match, but could instead be based on an approximate match, using for example Soundex code or similar technology.
(iii) Event: a symbolic code for an event between a user and the referred or matching item. Examples of events are:
 (a) Message read event: means users who read the referred item if the Match flag is clear, or a matching item if the Match flag is set. The referred or matching item could be an email message, or a message sent within a social networking site (SNS), etc.
 (b) Message sender event: if the Match flag is clear, means the user who sent the referred item, which must be a message. If the Match flag is set, means users who sent a message whose subject line matches the subject line of the referred item, which could be any type of item.

On the other hand, an expression-type specification defines a set in terms of a set operation that is to be processed on two parameter sets. The parameter sets are themselves each defined by a set specification. An expression specification has the following elements:

(i) Operation: a set operation specifying how to combine the two parameter sets. Examples are:
 UNION: This set consists of items that are in either parameter set. Items that occur in both sets occur only once in this set;
 INTERSECTION: This set consists of items that are in both parameter sets;
 COMPLEMENT: This set consists of items that are in the first parameter set but not in the second parameter set.
(ii) First parameter: a set specification, which itself may be of either list type or expression type.
(iii) Second parameter: another set specification, which again may itself be of either list type or expression type.

The simplest set specification would consist of only a list specification. At the other extreme, more complex set specifications can be seen as a "tree" data structure, with list specifications at the "leaf" nodes and expression specifications internally of the leaf nodes.

Event Types Table

The following table lists some event types which an event index can store. As noted above, event indexes can store a number of fields per event. The table lists some possible event types and describes the contents of the data fields.

| Event type | Item | User | Topic |
| --- | --- | --- | --- |
| Send | Email message or SNS message | The user who sent the item. | Subject line, or first line if the message medium does not have subjects.. |
| Read message | Email message or SNS message | A user who read the item. | Subject line, or first line if the message medium does not have subjects. |
| Read page | wiki page | A user who read the item. | Title of the page. |
| Edit | wiki page | A user who edited the item in a substantial way. | Title of the page. |
| Create | wiki page | The user who created the item. | Title of the page. |
| Update | SNS status update | The user who posted the update | Text of the update. |

The key to the table is as follows:
Event type: the event type
Item: the types of item with which this event can be associated, i.e. what types of item could occur as the item reference in the event index record for events of this type.
SNS is an abbreviation for social networking site.
User: the role of the user in an event of this type.
Topic: the source in the primary item of the topic for the event index.

Figure 5:
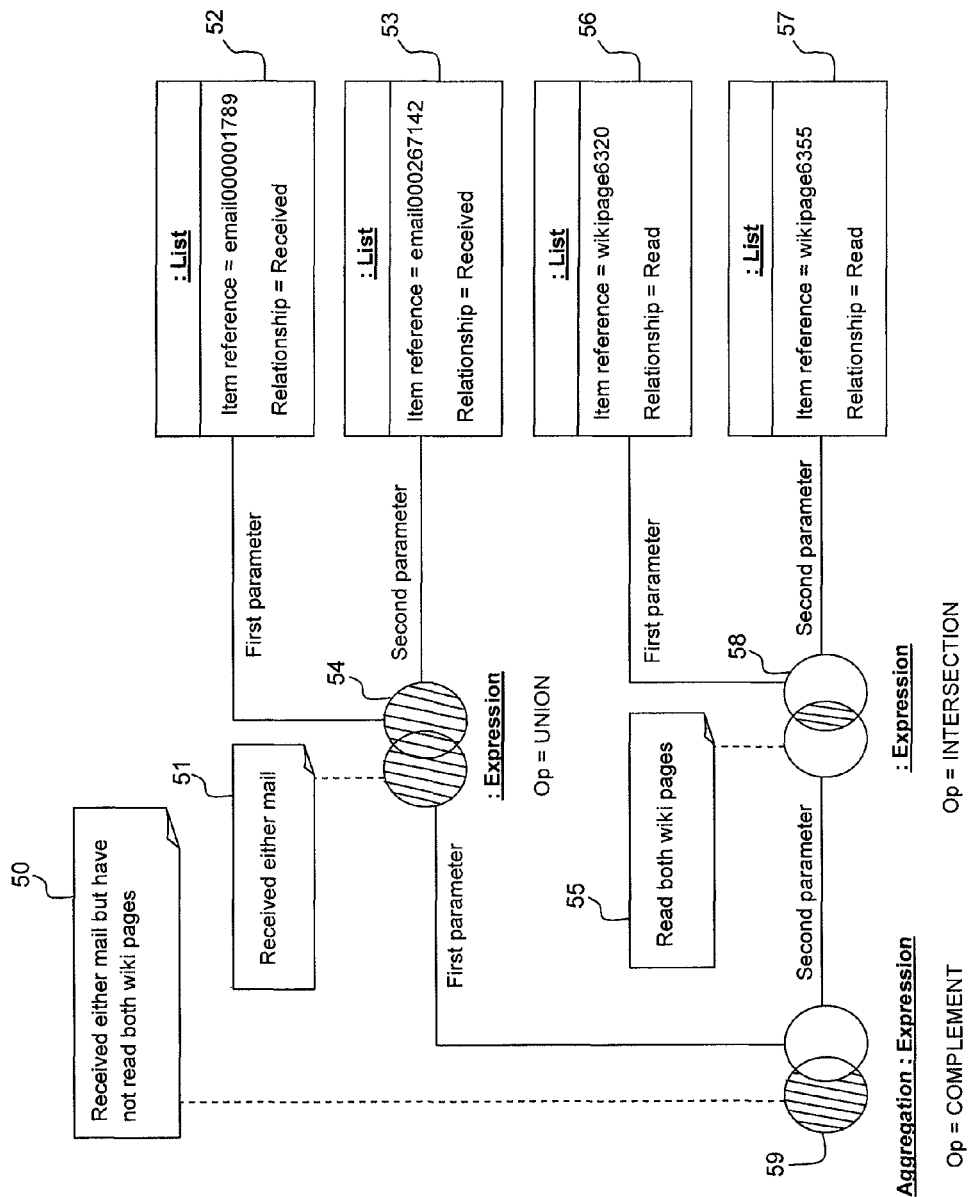
FIG. 5 shows schematically an example set specification.

FIG. 5 shows schematically an example of a set specification. In this example, the aggregation specified 50 includes users who received either of two email messages, but have not read both of two wiki pages. For the first parameter (received either email) 51, there is a first sub-parameter 52 indicating that the first email has been received and a second sub-parameter 53 indicating that the second email has been received. The union 54 of these is taken (reading of either of the two email messages meets the specification in the anonymous aggregation command). For the second parameter (not read both of two wiki pages) 55, there is a first sub-parameter 56 indicating that the first wiki page has been read and a second sub-parameter 57 indicating that the second wiki page has been read. The intersection 58 of these is taken (initially to find users who have read both wiki pages). For the resulting aggregation, the complement 59 of these is taken to find the users in first set, but not in the second set.

Anonymous Aggregation Processing

Single Index Network

Figure 6:
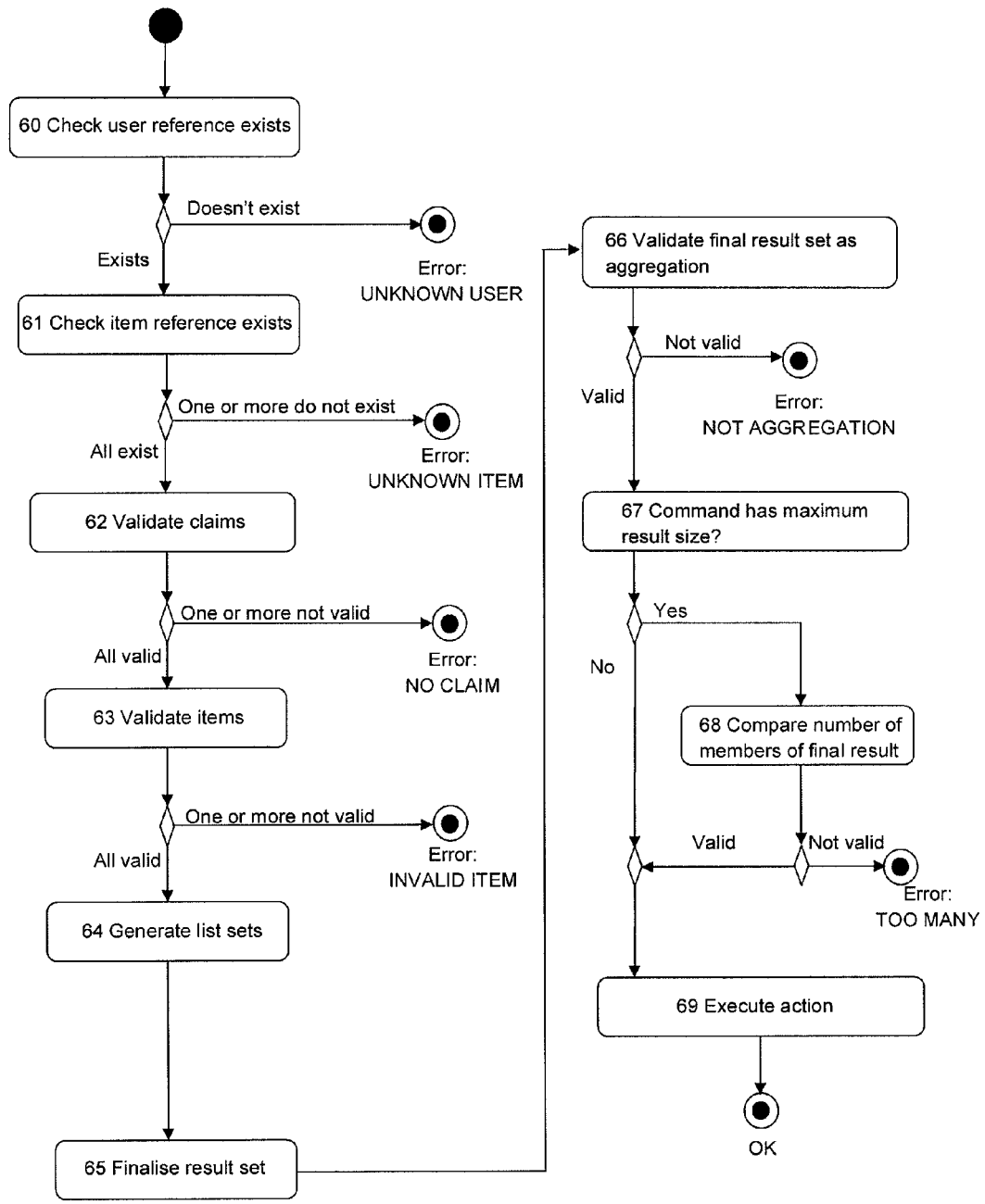
FIG. 6 shows schematically an example of anonymous aggregation processing using a single index network.

As mentioned, anonymous aggregation commands issued by user devices 2 are received and processed by one or more server(s) 1. The simplest case uses a single event index. In this case, as shown schematically in FIG. 6, processing at a server or servers 1 upon receipt by a server 1 of an anonymous aggregation command may proceed as follows:

1. Check user reference exists 60. The user reference in the command is checked as being known in the event index. If the reference is not known, then the command result is UNKNOWN USER, and no further processing takes place. The permissions of users to issue anonymous aggregation commands can be configured in terms including but not limited to types of aggregation that the user can specify, or types of command the user can include, or both.
2. Check item references exist 61. The item references in the command's aggregation specification are checked as being known in the event index. If any of the references is not known, then the command result is UNKNOWN ITEM, and no further processing takes place.
3. Validate claims 62. The index is checked for events that give the referred user a claim to the referred items of the aggregation specification. Examples include:
   (i) A referred item is an email message, and there is a Send event, with the referred user as the "actor" (i.e. the person who carried out the action): there is a claim.
   (ii) A referred item is a wiki page, and there is an Edit event for a substantial change, with the referred user as the actor: there is a claim.
   The criteria for which events constitute a claim to an item may be configurable within the system. Such criteria include the types of events, and the rules for what constitutes, for example, a substantial edit. Other possible criteria include for example that the event is not too recent and/or too old.
   If there is any referred item in the aggregation specification for which there is no event that gives the user a claim, then the command result is NO CLAIM, and no further processing takes place.
4. Validate items 63. The referred items are checked as being valid for anonymous aggregation. This may include the following checks for example:
   (i) For an email message, that it was sent to enough recipients. The event index could for example retrieve a list of distinct user references for a Message-Received event, and the list would then be counted.
   (ii) For a wiki page, that it has been read by enough users of the wiki. The event index could for example retrieve a list of distinct user references for a Page-Read event, and the list would then be counted.
   (iii) For any item, that it has been in existence for long enough, but not for too long. The event index could for example retrieve a Created event and the timestamp could be checked.
   (iv) For any item, that it cannot be claimed by too many recipients. For example, a wiki page that had been edited by every user would fail this test. The event index could for example retrieve a list of distinct user references for a Page-Edit event, and the list would then be counted.
   The exact threshold for all these validity checks may be configurable in the system.
   If any referred item in the aggregation specification does not pass all validity checks, then the command result is INVALID ITEM, optionally with a code for which items failed which validity tests, and no further processing takes place.
5. Generate list sets 64. For the or each list set in the aggregation specification in the command sent by the user device 2, a query is executed in the event index to retrieve the list of users in the list set. It may be noted that the technique of "lazy evaluation" can be used for this kind of processing in this case where a single index network is used, which can help optimise the process. This would mean, for example, not evaluating the second parameter set in an intersection operation if the first parameter set has already been evaluated and found to be empty.
6. Finalise result set 65. If there are any expression sets in the aggregation specification then the list sets generated in the previous step are combined according to the set operations specified in the expression sets. When all set operations have been processed, there will be a single set, which is the final result. Of course, for the simplest aggregation specification having a single list specification, no processing would happen in this step. In the case of a "tree" data structure mentioned above, the processing of this step starts at the leaf nodes and progresses to the root, which represents the final result.
7. Validate final result set as aggregation 66. The members of the final result set are counted. If there are too few, then the command result is NOT AGGREGATION and no further processing takes place.
8. Check for maximum result size 67, if any. If the action that was included in the command has a maximum result size, then a further validation takes place. The number of members of the final result set is compared 68 with the maximum result size. If there are too many, then the action is not taken. This is to prevent a user for example inadvertently emailing half the company. Some actions may have no maximum count. For example, returning a count of the members of the aggregation might have no maximum.
9. Execute action 69. If the final result set was found to be valid in the previous step, or no maximum result size was specified, then the action is taken. As just one example, this can be sending an email message to every member of the final result set. As another example, it may be a return to the user device of the number of users who have read a particular email or email concerning a particular subject, read a particular wiki page, etc.
10. Finalise command result. The command result consists of the following:
    (i) Count of the members in the final result set
    (ii) Status of the action as one of NO ACTION, if none was included; INVALID, if the final result set was found not to be valid for action; ACTION OK, otherwise.

One or more of the following enhancements may be applied to the above processing at the server(s) 1:

1. User reporting: although the system is designed to prevent abuse, it is possible that an individual with access to anonymous aggregation commands with actions may find a way to abuse the system. Reporting abuse by the originating user can be facilitated for users to whom anonymous aggregation actions are addressed. For example, a link or similar control could be automatically embedded in any email message sent as part of an anonymous aggregation command. Here, it is recalled that actions taken in an anonymous aggregation command preferably include an identification of the originating user, so additional reporting may be unnecessary.

2. Event item reporting: a feature for flagging certain events as not valid for anonymous aggregation may be added to the above.

3. Validate aggregations: items that are validated could be aggregations, as well as single items. For example, if the user had sent twenty different messages on a particular topic, and each message had been sent to two recipients, with thirty distinct recipients overall, the items could be validated in aggregate. Without this enhancement, the command would not be valid because none of the individual messages would be valid for aggregation.

4. Claim from aggregated passive actions: in the above, it has generally been assumed that the user must have positive involvement in a topic before they can issue anonymous aggregation commands. For example, a user must send an email or edit a wiki page; merely receiving an email or reading a wiki page is not enough, because these are "passive" not "positive" in the sense used herein. However, a view could be taken that a significant amount of passive activity qualifies the user as involved, especially if there is diversity. For example, if the user had received twenty different messages on a particular topic, from ten different senders, then the user could validly be regarded as having a claim to the topic of those messages. With that claim, the user could, for example, count or make contact with senders of messages on the same topic that had not included them. The user could also, for example, see how many users had read a wiki page with a matching topic.

In the above, at step 7 "Validate final result set as aggregation", it was stated that the members of the final result set are counted and, if there are too few, then the command result is NOT AGGREGATION and no further processing takes place. The use of "too few" is to help preserve the anonymity of the users. For example, consider the following case. An e-mail message E1 has been sent to 20 recipients R1 . . . R20. The sender S1 of the email message E1 now runs an anonymous aggregation command to find out how many of the recipients have read the message. The software discovers that only two recipients have read the mail: R12 and R18. So, the result of the command would be "2". But, if this result were displayed to the user S1, then the user S1 might very easily be able to determine which two people have read the message. For example, the message may have been sent to two close colleagues, as well as eighteen other people in the company. Once the user S1 knows who the two readers are, they know by elimination who the eighteen non-readers are. They can then pursue or even harass them, which is precisely what anonymous aggregation seeks to prevent.

The threshold for what constitutes "too few" is preferably configurable and may for example be configured at the level of the whole anonymous aggregation network, as a single number. The actual value of the threshold that should be used will depend on a number of factors, but likely suitable values are clearly at least 2, and perhaps any integer value between say 2 and 20, or perhaps more in some cases.

Returning to the above specific example, the result of the anonymous aggregation command is 2. The network checks its configuration and the aggregation threshold is 5. Therefore, the result set is too small to be safely used as an anonymous aggregation and processing stops.

Likewise, in the above, at step 8, it is stated that, in an example, the members of the final result set are counted and, if there are too many, then the action is not taken. This is for example to prevent a user, for example, inadvertently emailing half the company. The threshold in this case may for example be configured at the level of the network per action type, taking into account various factors that are relevant for the action. For example, the maximum number of recipients for an e-mail could be configured at 50 say, whilst the maximum number of tasks to create could be configured lower, say at 20. In this context, messages using different media or technology are best regarded as different actions, having their own criteria. For example, sending a twitter direct message is a different action from sending an email, with different ramifications and effects. This means that there can be different thresholds for different media.

Anonymous Aggregation Processing
Multiple Index Network

An anonymous aggregation network can have more than one event index, which typically requires additional processing and possibly infrastructure.

In the case of a Multiple Index Network as that term is used herein, the indexes work to the same scheme of user references and to the same scheme of event references. For example, user references might all be user IDs on the same enterprise email service. Where this is not the case, the arrangement referred to herein as Multiple Scheme Network may be used, as discussed in detail below.

The indexes may contain distinct event sets, or overlapping event sets, but cannot contain conflicting event sets. For example, only one index in the network may contain an event E1, recording that a user U1 sent an email message M1, at a time T1. Or, all the indexes might include that event, or only some of the indexes might include that event. But there could not be an index that included that event, and another index that included a conflicting event, for example with a different time T2, but all other details the same. (Note that there could be multiple occurrences of a read event, since email messages can be marked as unread and then re-read. This is not regarded as constituting a conflict within the system.)

For every event index, there will be a paired subset generator. The pairing of an index and subset generator is referred to as a node in the following description. Each event index can be queried only by its paired subset generator.

In every node, there can also be a subset addresser. Every subset addresser must be able to address every user in the network. To help preserve the "anonymity" feature of anonymous aggregation, there is preferably only limited sharing of information between nodes in a network. As part of this, subset addressers will only be able to take actions towards users whose references are known in their node, as discussed further below.

The step-by-step processing for a Multiple Index Network follows a similar pattern to the processing for a Single Index Network, see above. The main differences are as follows:

1. Check user reference exists. Every node makes the check described above. The user is regarded as known if its reference is known in any event index.

2. Check item references exist. Every node makes the check described above. An item is known if its reference is found in any event index.
3. Validate claims. Every node checks every referred item, as described above. The user has claim to a referred item if there is an event that gives a claim in any event index. Events that give a claim to different items in the aggregation specification need not be in the same event index.
4. Validate items. The checks for validity are either made by every node separately or collectively, depending on the type of check:
   (i) Checks that require only a single event's data, for example the check for the age of the item, are made by every node separately. Assuming that there are no conflicts, the check passes on the network if it passes on any node.
   (ii) Checks that require data from more than one event, for example the check that an email message had enough recipients, are made collectively. Collective checks can use a semi-anonymous list sharing method, which is described below. The list items here will be user references. In each check, there will be only a single reference scheme. (Reference schemes are a part of "semi-anonymous list sharing", discussed further below.)
5. Generate list sets. As follows:
   a. Every list set is generated at every node. Since each node has access to only a single event index, each node can generate only a partial result list, based on the data in the event index to which it has access.
   b. The partial results in every node can be shared with every other node using the semi-anonymous list sharing method, which is described below. The list items here will be user references. In each partial result, there will be only a single reference scheme.
   Once all partial result lists have been shared, all nodes will have result lists that are complete though possibly including "semi-anonymous" items. In each node, the semi-anonymous items will be for user references that were initially retrieved from the event indexes of other nodes. See further below under Semi-Anonymous List Sharing.
   The lists generated in this step are stored in the node until the command has finished.
6. Finalise result set. Combination of list sets takes place at every node, and produces an equivalent final result in every node. Lists in different nodes could have different mixes of semi-anonymous and "clear" items. See under Semi-Anonymous List Sharing below for details on how set operations can be processed for these lists.
7. Validate final result set as aggregation. Prior to the counting of the final result set's members, an additional step is necessary if the action requires addressers. So, for example, an action, such as sending an email message, would be taken towards all the users in the final result set. The subset addressers are the components that take the action; each node has one. The operation of semi-anonymous list sharing means that the subset addresser in a node will only be able to take actions towards users whose references were known in that node at some point in the current command's processing.
   Since all user references in the final result originate in a node, it is theoretically impossible that there is any item in the final result set that cannot be addressed. However, it is possible for an address to be known in more than one node, for example if the associated user was present on more than one list set, or if an event for the user was present in more than one event index. Hence it is preferred to have an additional processing step where a single actioning node is identified for each user in the final result set. For resilience, if there is any user reference that cannot be addressed, then that reference is removed from the final result list before counting.
   The counting of the members in the final result set could take place in every node, and would have the same result. It may be noted that counting members need not involve a subset addresser, and there would then be no need to identify actioning nodes.
8. Check for maximum result size. The members need only be counted in any nodes that are to be the actioning node for any address whose user is referred to in the final result set.
9. Execute action. The retained lists can be utilised to retrieve "clear" addresses for use by subset addressers.
10. Finalise command result. At this point, all nodes could release any resources associated with the command, such as copies of set lists.

A number of enhancements or optimisations are possible:
1. Parallel execution in all nodes.
There are a number of approaches to distributing the processing of a command in a multiple index network.

One approach would be to have a single instance of the command. In this approach, the command would be sent to a designated "first" node. That node would execute its processing for the command, and then send the command on to the next node. This would continue until the command had been processed at every node. In the above processing outline, it would be necessary for a command to make multiple circuits around all the nodes in the network. This can be regarded as being analogous to a token-ring network architecture.

Another approach is analogous to an Ethernet architecture. In this approach, the command is sent to some or all nodes at the same time. Each node would execute its processing, flag the command as having been completed at that node, and then itself broadcast the flagged command. Nodes could stop broadcasting a command when a copy was received that was flagged by all nodes. In the above processing outline, there are some processing stages that must be completed at all nodes before the next stage can commence. This could be handled in this approach by broadcasting a next-stage command when the current-stage command is complete at all nodes. In this second approach, the flags added by nodes could be cryptographically hashed so that no individual node would know which other nodes had processed or not processed a command. This would further help guard anonymity. Nodes could change their hashing key or algorithm on every command.

The list of nodes, and their communication addresses, could be held centrally on the network, or broadcast with every command, or could be held locally on the nodes of the network. Some nodes could serve as trunk lines that broadcast messages to other nodes.

As a general statement, anonymous aggregation on a Multiple Index Network can be regarded as an application of distributed processing. Existing or new distributed processing technologies may achieve or surpass the optimisations listed here.

2. Finalise only where necessary
In the example of the processing set out above, finalisation of the result set takes place in every node. This is not strictly necessary. Instead, a designation of a final node could be made at an early stage of processing. If the command has an action that is just returning a count of relevant users (i.e. readers of an email, readers of a wiki page, etc.), finalisation need only take place in the designated final node. Otherwise, finalisation needs to take place in the designated final node, and in any nodes that are actioning nodes for the final result set.

Smart selection of the finalising node could bring further performance improvements. For example, if one node is found to have access to all the data necessary to identify the final result, then selecting that node as the finaliser would reduce the amount of network traffic required to process the command.

3. Node dropping

In the above outline, a number of processing stages take place in every node. This is not strictly necessary for all stages in all nodes. In some cases, it could be determined that a particular node has no further contribution to make to the processing a particular command. That node could then be dropped from subsequent broadcasts of the command.

For example, if a node executed list set generation, and all its list sets were empty, then the node could be dropped. The status of the node as dropped could be broadcast by the node itself, or there could be an implied drop, where the node drops itself by not continuing to broadcast.

Another example of dropping, which applies when there are overlapping indexes, could occur if a particular node, or small set of nodes, identify that no other nodes are necessary to complete a command. These nodes could drop all other nodes from the command. (If all indexes were distinct and non-overlapping then this form of dropping would have the same results as the self-dropping in the previous example.)

4. Lazy evaluation

Similar to node dropping is the concept of lazy evaluation. Using lazy evaluation, certain parts of a command could be curtailed before having been processed on all nodes in the network. This could be applied to any processing stage in which passing a check on a single node implies that the check is passed on the whole network. For example, the check that a user reference exists need only proceed until the first node that finds a known reference. No further nodes need make the check.

Commands could be sub-divided into list generations and set operations and these could be executed in parallel, at least to some extent. This would allow for lazy evaluation gains such as not evaluating the second parameter set of an intersection operation when the first parameter has evaluated to the empty set.

5. Multiple actions

The command outline above allows for only a single action to be present in the command. Since the processing that precedes the command, verification and aggregation generation, is relatively lengthy, a saving could be made by allowing multiple commands to be applied to the same result set.

6. Early actioning node assignment

Actioning nodes could be identified in the list generation stage of processing. When list sets are shared, the node from which a list item originated could be recorded on each item in the list. Then, at the aggregation validation stage (discussed in the processing outline above), the originating node could be taken as the actioning node without the need for a further processing step.

It is possible that a user reference is discovered in two nodes (also discussed in the processing outline above). This would be identified during the result set finalisation stage. Discovery could happen in an intersection operation, or in a union operation, where duplicates are removed. In either case, one originating node has to be selected as the one to go forward as the recorded node of origin. One algorithm for selecting the node of origin would be to select the node that originated the most nodes in the list. This could tend to reduce the number of actioning nodes, itself another optimisation. At any point that a node is not the node of origin for any list item, the node could be dropped.

It may be noted that this optimisation may reduce resilience. It is possible that, by the time all result set processing is complete, the node of origin is not available to process the action. In that case, a new actioning node would have to be identified from the nodes that had not been dropped from the command.

7. Nodes as data processors

Extra nodes can be added to the network simply to bring more resources to bear on the processing requirement, which is a form of optimisation.

Multiple Scheme Network

As noted above, an anonymous aggregation network can have event indexes that utilise different user reference schemes. For example, user references in some indexes might be user IDs on an enterprise email service, whilst another index has references to account IDs on an on-line social network. For the purposes of this description, multiple scheme networks are assumed to be multiple index networks. Some indexes in the network could cover the same data set, as in the Multiple Index Network described above.

Indexes that use different reference schemes implicitly cover distinct event sets. For example, an email message would be covered by an index of the email system, but would not be covered by an index of a social networking site.

A Multiple Scheme Network can have nodes in the same way as a multiple index network, see above. In addition, nodes can reference different external data, with different reference schemes. For example, two nodes might reference an enterprise email system, whilst another references a social networking site.

In every node there can also be a subset addresser. Every subset addresser is able to address users that have references in the reference scheme of the node's index. For example, the subset addresser in a node that includes an index of a PIM system can assign tasks to users in that system, the subset addresser in a node that includes an index of a social networking site (SNS) can send SNS messages to users of the site, etc.

To help preserve the anonymity of anonymous aggregation, there is only limited information sharing between nodes in a network. As part of this, subset addressers will only be able to take actions towards users whose references are known in their node. This is the same as described for the Multiple Index Network above.

To enable aggregation between different reference schemes, one or more of the nodes in a network can be capable of mapping between reference schemes. Mapping can be by means of mapping tables or partial mapping tables to which one or more nodes have access. Mapping tables can be limited to data to which the command's originating user has access, for example the user's address book on the enterprise PIM server. Not all nodes need access to mapping, and no node needs complete mapping. See under Semi-Anonymous List Sharing discussed below for more details on mapping.

The step-by-step processing for an example of a Multiple Index Network follows a similar pattern to the processing for a Single Index Network described above. The differences are as follows:
1. Check user reference exists. No difference. Note that the user reference can be specific to a reference scheme, in which case the reference would not exist in any node that does not index event data that utilises that scheme. This does not constitute a difference, since the reference need only exist in one node to pass the check.
2. Check item references exist. No difference but see the notes in the previous step, which apply here.
3. Validate claims. No difference.
4. Validate items. No difference. As noted in the Multiple Index Network processing steps above, in each check, there will be only a single reference scheme.
5. Generate list sets. The list items here will be collections of user references, where every reference in a single item refers to the same external entity. (For example, a single item could contain a person's user ID for an email and PIM system, and their account ID on a social networking site. In this case, the external entity is the person.) References in the same list item will be in different references schemes. The partial results in every node can still be shared using the semi-anonymous list sharing method, which is described below. In every partial result there can be multiple reference schemes; see Multiple-Scheme List Sharing under Semi-anonymous list sharing below.
6. Finalise result set. No difference. Note that set operations can be processed on semi-anonymous shared lists with multiple reference schemes, as discussed for the semi-anonymous list sharing method below.
7. Validate final result set as aggregation. Prior to the counting of the final result set's members, an additional step is necessary if the action requires addressers. This is similar in principle to the corresponding step in a Multiple Index Network which covers only a single scheme. Every user in the final result is assigned a single node that can take the action, and any users to whom the action cannot be addressed are removed from the final result set. Having multiple external systems facing the anonymous aggregation network introduces a case in which an action cannot be addressed.

Actions can be generic or system-specific. A generic action is one that applies across all external systems that are covered by the anonymous aggregation network. A system-specific action is one that applies to a subset of the covered systems. For example:
  (i) sending a message could be a generic action, if the systems covered were an email system and an on-line social network that supported messaging;
  (ii) assigning a task could be a system-specific action, for example if the systems covered were an email and PIM system that supports task assignment and an on-line social network that does not.

A system-specific action implicitly cannot be taken on items in the final result list that do not contain a user reference for a system in which the action is supported. For example, suppose the action is a task assignment. If there was an item in the final result list that contained an account ID for an on-line social network, but did not contain a user ID for the enterprise email and PIM system, then the action could not be addressed to the user in question. (For this to happen, the aggregation specification of the command would have to be a union between lists that were specified on the enterprise email and PIM system, and the on-line social network)
8. Validate final result set for action, if any. No difference.
9. Execute action. No difference.
10. Finalise command result. No difference.

The optimisations that apply to the Multiple Index Network discussed above also apply to this Multiple Scheme Network.

Semi-Anonymous List Sharing

Semi-anonymous list sharing referred to above relates to a method of sharing data in which one node in a system creates a list that can be checked for common elements by another node, without requiring that the other node can read the whole list. This method can be used where there is a need to share some data between nodes that are generally segregated.

The list being shared can be for example a list of references to external entities. For example, a list of user IDs or email addresses is a list of references to external entities that are people. The nodes can be computers in a network. Each node can have access to a set of data relating to the external entities, for example a database of email activity, including the senders and recipients. Nodes on the same network could have access to distinct or overlapping data sets.

An example scenario for the above requirements is as follows:
1. There is a network of nodes, where the nodes are computers with access to event data relating to email messages in an email system. No node has access to all the event data. Nodes generally do not share the data to which they have access. (This describes a typical anonymous aggregation network, see above.)
2. A query is issued on behalf of a user of the system to count the how many of the recipients of an email message that the user sent have now read the message. (This is a typical anonymous aggregation command, see above.)
3. Every node in the network can execute a query on read events for the message in question. This gives every node a list of references to email users. In some or even all nodes, the list may be empty.
4. In order to complete the query, the lists in every node now need to be shared in such a way that:
   (i) There are no duplicated references on the shared list.
   (ii) The number of references on the shared list can be counted by any node.
   (iii) Each node can only read references on the shared list that were retrieved by the query executed in that node.

This can be achieved using for example the method discussed under Single-Scheme List Sharing below. This shared list can serve as an anonymous aggregation final result list, see above.

Single-scheme list sharing can also be used in scenarios that are similar to the above, but where:
  (i) The event data relates to other types of PIM data as well as email, for example tasks, calendar items and contacts.
  (ii) The event data relates to a wiki instead of an email system.
  (iii) The event data relates to an on-line social network site, instead of an email system.
  (iv) The data relates to any other system where there is a scheme of unique references.

The list being shared can contain multiple references in each item, where the references are in different reference schemes. References that are contained in a single item all refer to the same external entity. For example, a person's email address, and their account ID in an on-line social network, are references to the same external entity (the person) in different reference schemes.

Where multiple reference schemes are in use in the system, each node preferably has a native reference scheme. This is the scheme for references on the list generated by that node, prior to sharing. One or more nodes should have access to a mapping table that identifies where references in different schemes refer to the same external entity. The mapping table need not be complete. Different nodes can have access to different mapping tables. One example of a mapping table is a contacts PIM store whose records could include both email addresses and on-line social networking IDs. The mapping table would generally be specific to a user of the system. In the contacts store example, this could be the address book of an end user of the system, where an anonymous aggregation command has been issued on behalf of the user and lists are being shared as part of the processing of that command. So, a list with multiple references per item can include sparse items, in which one or more reference schemes are not represented. This will happen where a node's mapping table does not include all of the references that are on the list that the node will share. For example, the first item in a list could have just a person's email address, the second item could have a (different) person's account ID in an on-line social network, as well as their email address.

Semi-anonymous shared lists with multiple reference schemes can be used in scenarios like the following:
1. There is a network of nodes, where the nodes are computers with access to event data. Some nodes have access to data relating to email messages in an email system. Other nodes have access to data relating to messages sent in an on-line social network site (SNS). No node has access to all the event data. Nodes generally do not share the data to which they have access. (This describes a typical anonymous aggregation network, see above.)
2. A query is issued on behalf of a user of the system to count how many other users have sent messages with similar subjects to a message that the user sent. This means messages within the email system, or messages within the SNS. (This is a typical anonymous aggregation command, see above.)
3. Each node may or may not have access to a mapping table that identifies SNS user IDs and email user IDs that belong to the same person. These mapping tables need not be complete. The mapping table to which any node has access could cover only references that have been entered by the user on whose behalf the query is being executed.
4. Every node in the network executes a query that retrieves sender information for matching messages. This gives each node either a list of references to email users, or a list of references to SNS users. In some or even all nodes, the list may be empty.
5. Every node that has a mapping table then looks up the references on its own list in its mapping table. Where an SNS user can be mapped to an email user, or vice versa, the mapped reference is added to the item in the node's list that held the original reference. This gives every node a possibly sparse list of paired SNS and email user references.
6. The lists in every node now need to be shared in such a way that:
   (i) There are no duplicated references on the shared list.
   (ii) The number of reference pairs on the shared list can be counted by any node.
   (iii) Each node can only read references on the shared list that were either:
      Directly retrieved by the query executed in that node, or
      Mapped to or from a directly retrieved reference using the node's mapping table.

This can be achieved using for example the method detailed under Multiple-Scheme List Sharing discussed below. This list can serve as an anonymous aggregation final result list, see above.

Multiple-scheme list sharing can also be used in scenarios that are similar to the above, but where:
   (i) Some nodes have access to events for other types of data store, such as other types of PIM, or a wiki, or any other system where there is a scheme of unique references.
   (ii) There are two or more on-line social network services in use on the network.
   (iii) There are two or more email systems with separate reference schemes in use on the network.
   (iv) There are, in general, nodes with access to three or more types of data store where each store uses its own reference scheme.

Semi-anonymous shared lists can be combined using set operations such as union, intersection and complement. Set operations on semi-anonymous shared lists can be used in scenarios like the following:
1. There is a network of nodes, where the nodes are computers with access to event data. Some nodes have access to data relating to email messages in an email system. Other nodes have access to data relating to messages sent in an on-line social network service (SNS). No node has access to all the event data. Nodes generally do not share the data to which they have access. (This describes a typical anonymous aggregation network, see above.)
2. A user of the system wishes to know how many other users have sent messages with similar subjects to either of two messages that they sent. This means messages within the email system, or messages within the SNS. For example, suppose the user had sent one message about laptop computers, and another about computers running Linux. The user wants to know how many people have sent a message about either of those subjects. (This is a typical simple anonymous aggregation command, see above.)
3. The nodes on the network create and share two semi-anonymous lists, with multiple reference schemes. (See the multiple reference schemes scenario above.) Each list includes senders of email or SNS messages that match the subject of one of the email messages.
4. The two semi-anonymous lists now need to be combined into a single list that contains senders from either list, and which can be shared in such a way that:
   (i) There are no duplicated references on the shared list.
   (ii) The number of reference pairs on the shared list can be counted by any node.
   (iii) Each node can only read references on the shared list that were either:
      Directly retrieved by the query executed in that node, or
      Mapped to or from a directly retrieved reference using the node's mapping table.

This can be achieved using a union operation according to the method discussed under Set Operations below. This list can serve as an anonymous aggregation final result list, see above.

Set operations on semi-anonymous list sharing can also be used in scenarios that are similar to the above, but where:
   (i) The user wishes to know about senders of messages that match both of the subjects of their messages, not either. In the example in the above scenario, this would be people that sent a message whose subject mentioned both laptop computers and computers that run Linux. In this variant, an intersection operation would be used.

(ii) The user wishes to know about senders of messages that relate to only one of the subjects of their messages but not both. In the example in the above scenario, this could be people who sent a message whose subject mentioned laptop computers but not those who sent a message whose subject mentioned computers that run Linux, or vice versa. In this variant, a complement operation would be used.

(iii) There is only a single reference scheme in use.

(iv) One or both lists relate to more different types of data, such as wiki page edits and email messages, or task PIM and SNS status updates, or any other different databases whose reference schemes relate to the same external entities.

(v) One or both of the shared lists is itself the result of a set operation on two other shared lists.

The following sub-sections discuss examples of some of the details of the methods mentioned above.

Single-Scheme List Sharing

Figure 7:
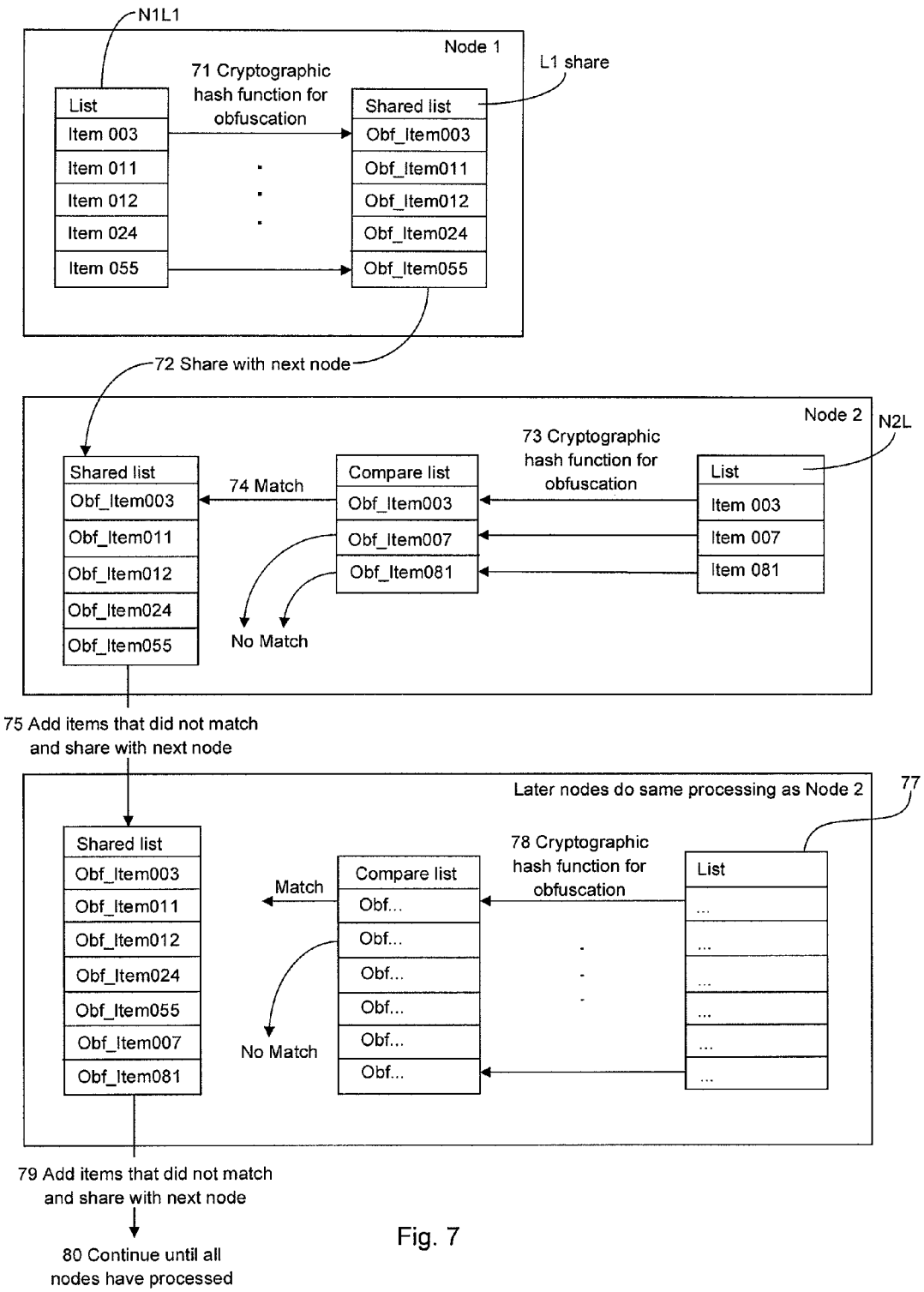
FIG. 7 shows schematically an example of single-scheme list sharing.

This method can be used when there is a single scheme of references used by all nodes on the sharing network. Referring to FIG. 7, an example of the processing that can be carried out is as follows:

1. The initial node, Node 1, executes the required query and generates a list of references, N1L1.
2. Node 1 generates a list for sharing, L1share, as follows. For each reference on N1L: apply an irreversible (i.e. "lossy") cryptographic hashing function 71 to the reference, and add the hashed value to L1share.
3. Node 1 passes 72 the list of hashed values, L1share, to the next node.
4. The next node, Node 2, executes the required query and generates its own list of references, N2L.
5. Node 2 modifies L1share, as follows. For each reference on N2L: apply the same irreversible hashing function 73 to the N2L item, then see if it matches 74 any of the items on L1share. If it does not match, append 75 the hashed reference to L1share. If it does match, do nothing. The hashed values may be sorted to improve search performances.
6. Node 2 passes 76 the, possibly modified, list of hashed values, L1share, on to the next node.
7. The next node takes the same actions as Node 2: generate a list 77, apply a hashing function 78, add any hashed references 79 that are not already present to L1share. The node then passes the list on to the next node, and the process repeated 80 until all nodes in the network have done the above processing.
8. When all nodes have done the above processing, the final L1share is passed around the network again, to every node, so that all nodes have the complete list.

Note that Node 2 was not able to read the items on the list passed from Node 1, but was able to match them with any items on its own list. This was achieved through the use of a cryptographic hashing function. See the note below on small reference spaces.

Each node would retain its own query result list (Node 1 retains N1L, Node 2 retains N2L, and so on) until the command that required the shared list had finished processing. See the description of result list finalisation in the Multiple Index Network sub-section of Anonymous Aggregation Processing above.

The same hash function was used on all items, and in both nodes. This may be deemed to be insufficiently secure in some circumstances. See the Multiple Functions note below.

Multiple-Scheme List Sharing

This method can be used when there are multiple schemes of reference in use on the sharing network. The processing for multiple schemes is in some ways a generalisation of the processing for single schemes discussed above.

In summary, an example of multiple-scheme list sharing differs from the single-scheme list sharing discussed above as follows:

(i) List items can contain multiple hashed references, not just a single hashed reference. Hashed references in the list item are identified as to their reference scheme.

(ii) List items need not contain a hashed reference for every scheme that is in use on the network, i.e. list items can be sparse.

Figure 8:
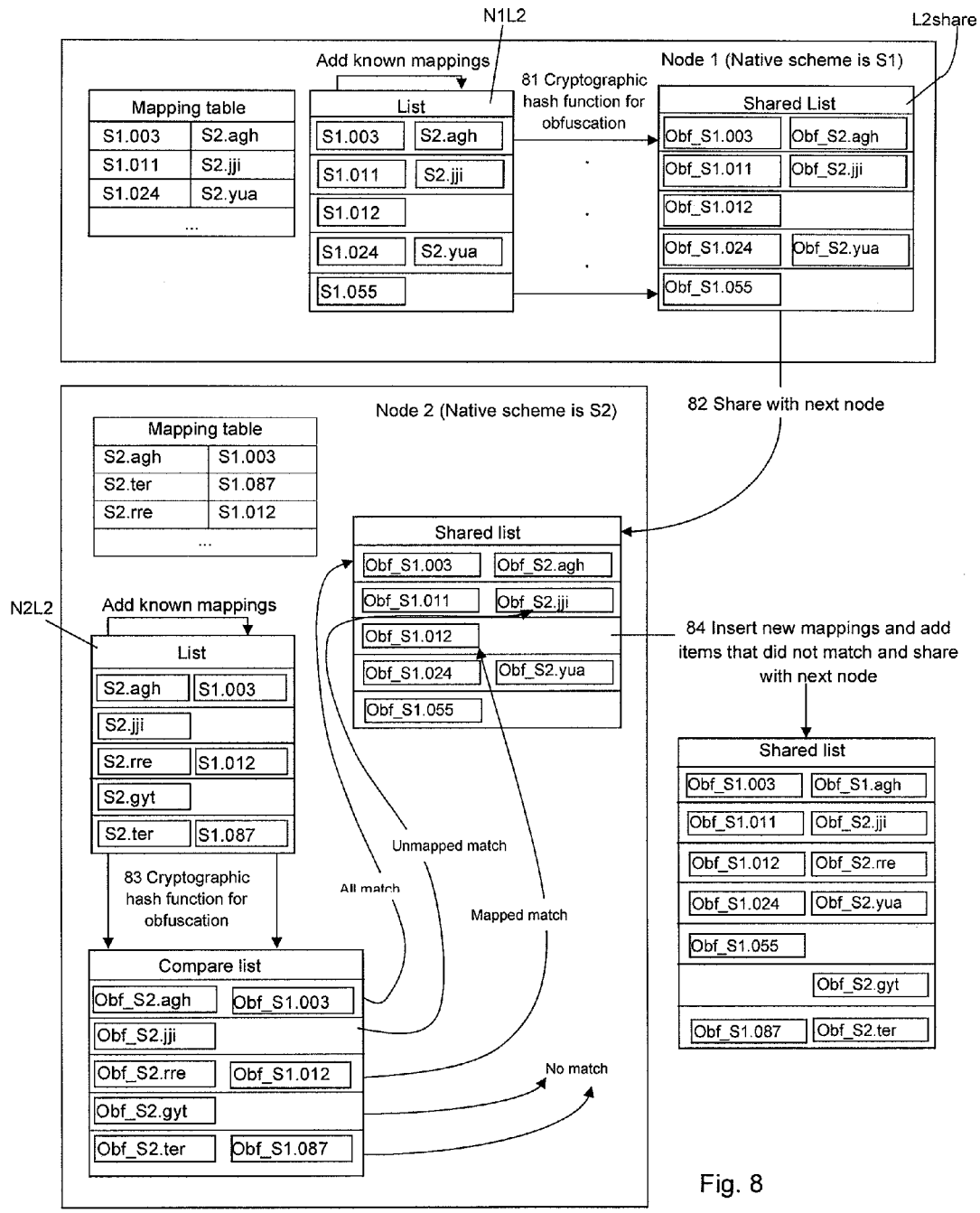
FIG. 8 shows schematically an example of multiple-scheme list sharing.

In detail and referring to FIG. 8, an example of the processing is as follows:

1. The initial node, Node 1, executes the required query and generates a list of references, N1L2. The reference scheme for items on N1L2 is the native scheme of Node 1, identified as S1.
2. Node 1 generates a list for sharing, L2share, as follows.
3. Node 1 does the following for each reference in N1L2:
   a. Add a new empty item to L2share, L2share[new].
   b. Apply an irreversible cryptographic hashing function 81 to the N1L2 reference, and add the hashed reference to L2share[new], identified as the S1 reference.
   c. Check for mappings from this S1 reference to references in the other schemes in use. For any mapped references found, apply the hash function, and add to L2share[new], identified as whichever is the mapping's reference scheme.
   After this, the L2share list has as many elements as N1L2. Each element contains at least a hashed reference in the S1 scheme. Each element also contains hashes of any references in other schemes that were available through mapping in Node 1.
4. Node 1 passes 82 the list of items, L2share, to the next node.
5. The next node, Node 2, executes the required query and generates its own list of references, N2L2. The reference scheme for items on N2L2 is the native scheme of Node 2, identified as S2. (For the purposes of this description, S2 is assumed to be different from S1, meaning that the nodes Node 1 and Node 2 have different native reference schemes.)
6. Node 2 then does the following for each reference on N2L2:
   a. Check if the S2 reference can be mapped by Node 2 to a reference in any of the other schemes in use.
   b. For the original S2 reference, and for any references to which mappings could be found, apply an irreversible hashing function 83. This generates a number of hashed references.
   c. Check if any of the hashed references match any of the hashed references in the same scheme in the L2share list. (The hashed S2 references are only checked against hashed S2 references in the L2share list. Any hashed S1 references, which would have been found by mapping in N2, are only checked against hashed S1 references in L2share. And so on for all reference schemes in use.)
   d. If there was no match, append a new item to L2share and add the following to the item:
      (i) A hash of the S2 reference, identified as the S2 reference.

(ii) For every reference found by mapping the S2 reference to another scheme, and a hash of the reference, identified with its reference scheme.

e. If there was a single match, check the matching list item. If N2 has mapped references for any schemes that are not already contained in the L2share item, add hashed references for these schemes to the L2share item now.

f. In Node 2 it would not be possible to have multiple matches, but see further below.

After this, the L2share list may have been changed in two ways. L2share may have been extended with any new references and mappings from Node 2. Also, any mappings that were not available on Node 1 but which were available on Node 2 will have been filled in. The filling-in of new mappings is referred to as list improvement in the rest of this document.

7. Node 2 passes 84 the improved L2share list on to the next node.

8. The next node also executes list improvement on L2share and passes the list to the next node. This continues until all nodes in the network have improved the list.

It may be noted that it is possible that multiple matches occur from the third node onwards. The occurrence of multiple matches means that a situation like the following has arisen: N1L contained Ref1S1 but Node 1 could not map this to another scheme; N2L contained Ref1S2 but Node 2 could not map this to another scheme, hence Ref1S2 was added to L2share as a new item; N3L contained Ref1S1 and Node 3 could map this to Ref1S2, hence this matches two items already on L2share. If there are multiple matches, all the matching items may be merged into a new list item that contains hashed references for every scheme available in any matching item, or in the list generated by the node, or in the mappings available at the node.

9. When all nodes have done the above processing, the final L2share is passed around the network again, to every node, so that all nodes have the complete list.

Note that, as with single-scheme sharing, Node 2 was not able to read the references on the list passed from Node 1, but was able to match them with references on its own list, and references to which it could map its own list. This was achieved through the use of a cryptographic hashing function. Again, see the note below on small reference spaces.

As with single-scheme sharing, each node would retain its own query result list (N1 retains N1L, N2 retains N2L, and so on) until the command that required the shared list had finished processing. See the description of result list finalisation in the Multiple Index Network sub-section of Anonymous Aggregation Processing above.

The same hash function was used on all references, and in both nodes. This may be deemed to be insufficiently secure in some circumstances. See the Multiple functions note below.

Set Operations

As mentioned above, semi-anonymous lists can be combined with set operations. In general, a set operation can be made on two input semi-anonymous lists and results in a single output semi-anonymous shared list. The output list still has all the characteristics of a shared semi-anonymous list.

Set operations can include the following:

1. UNION: The output list consists of items that are in either input list. Items that occur in both input lists occur only once in the output list.

2. INTERSECTION: The output list consists of items that are in both input lists.

3. COMPLEMENT: The output list consists of items that are in the first input list, but not in the second input list.

Set operations can be made on lists that use a single reference scheme, and on lists that use multiple reference schemes. It may be noted that in the preferred multiple-scheme processing, list improvement will always precede set operations.

In embodiments, processing of any set operation begins with finding common items in the input lists. After that, processing differs depending on the set operation. The whole sequence is as follows:

(Since single-scheme is a special case of multiple-scheme, the description below includes only the multiple-scheme case.)

1. The parameters of a set operation are:
Operation: INTERSECTION, UNION, or COMPLEMENT
LIST1: The first input list
LIST2: The second input list
Items on both lists are sparse collections of hashed references, where every reference is in a different reference scheme, and its scheme is identified.

2. The common items list, COMMON, is generated, as shown in the following steps.

3. For every item in LIST1, check its hashed references against the hashed references in every item in LIST2. (References are only checked against other references that have the same scheme.)

4. If any hashed references match, add the LIST1 item to COMMON. (Note that it is impossible for one hashed reference to match and another not to match, in a single item. It is possible that the hashed references in some schemes match but others are absent from one or both list items.) Then merge in any hashed references for schemes that are present in the matching LIST2 item but absent from the LIST1 item. This is a further form of list improvement, see above.

5. Once all LIST1 items have been checked, the COMMON list is final and processing continues depending on the operation, as follows.

For INTERSECTION, the output list is the COMMON list.

For UNION, the output list is the COMMON list, plus any items on LIST1 that do not match any item on the COMMON list, plus any items on LIST2 that do not match any item on the COMMON list. (This definition is used because the items on the COMMON list may have list improvement over LIST1 and LIST2.)

For COMPLEMENT, the output list is LIST1 without any items that match any item on the COMMON list. (In this case there is no benefit from list improvement.)

In all the above processing, "matching" means having any hashed references the same. This is the same algorithm as used when generating the COMMON list in the previous steps.

6. The output list is now final and the set operation is complete

It may be noted that the output list is still suitable for semi-anonymous sharing.

Multiple Functions

As mentioned above, in the examples of processing described above, only a single cryptographic hashing function is mentioned. This may be deemed to be insufficiently secure for some cases. The following alternatives are possible to address this.

A cryptographic hash function that takes a key as a parameter can be used. The key can be cycled periodically in the network. A new key may have to be phased in, so that any in-progress commands could complete with the old key.

An array of keys can be used, with each list or command using a particular key.

Instead of hashing the references with a key, the references could be used as keys to hash a well-known value, or a value that changes with every command or list.

Small Reference Spaces

The methods described above rely on cryptographic hashing for obfuscation of references. This requires a cryptographic hashing function that makes the references generated by the first node unreadable on the second node, but still able to be matched by the second node, if the second node can apply the same function. The second node should only attempt to match the obfuscated references on the list from the first node with references on its own list. However, a rogue node might attempt to match other references, speculatively, in order to read the list from the first node. This constitutes a so-called "brute force" attack. A brute force attack might also be possible where an attacker gains access to lists of references that are in transit between nodes.

There are a number of defences against these attacks.

Communications between nodes should be protected by use of a secure socket layer, transport level security (SSL/TLS), or an equivalent or superior technology. This defends against attackers seeking to gain access to reference lists that are in transit between nodes.

Using a changing hash key also protects against interception, especially if the key is circulated using a different arrangement from that used to share semi-anonymous lists.

Nodes whose data has a very large number of possible references are intrinsically less vulnerable to attack. This is because the attacking node would have to attempt many more speculative matches to read a value. This would apply to a popular social networking site, for example, with millions of users, and hence millions of references. Conversely, nodes whose data has a small number of possible references are more vulnerable, and may even be indefensible. For example, an email system at a very small company with only 10 users probably could not be defended. In that case, a node may be regarded as not viable for anonymous aggregation, and exclude itself. There could be a configurable threshold, stated in terms of the number of events that must be in the index for example. The threshold could be set at the network level and applied to all nodes.

In between the extremes of a very large number of users and a very small number of users, there may be systems with enough users to require anonymous aggregation, but with few enough users that a brute force attack is relatively easy. There are a number of approaches that could reduce this vulnerability, see the following.

It may be possible to increase the number of references artificially, by assigning a number of random references per real external entity. For example, for every user of an email system, 1,000 random references could be created. When an event was retrieved from the event database by a node, one of the random values could be selected. (The selection is preferably made by hashing an identifier associated with the event, to prevent artificial duplication. Artificial duplication would mean, for example, having two records for the same user having read the same email message.)

Nodes can be given permission to see only a subset of references. For example, a node could be given access to the data for only half the users in an email system. In that way, the node would never be able to probe for references in the other half.

Although at least some aspects of the embodiments described herein with reference to the drawings comprise computer processes performed in processing systems or processors, some embodiments also extend to computer programs, particularly computer programs on or in a carrier, adapted for putting the embodiments into practice. The program may be in the form of non-transitory source code, object code, a code intermediate source and object code such as in partially compiled form, or in any other non-transitory form suitable for use in the implementation of processes according to embodiments of the disclosure. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc. The processors or processing systems or circuitry referred to herein may in practice each be provided by a single chip or integrated circuit or plural chips or integrated circuits The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of anonymising user data by aggregation, the method comprising at least one server-side device:
   receiving, at the at least one server-side device, an anonymous aggregation command from a user client device, the anonymous aggregation command including a specification of a set of users, the specification relating to user behavior, the anonymous aggregation command further including an action to be taken in respect of at least some of the users who meet the specification;
   generating an aggregated list of users who meet the specification in the anonymous aggregation command;
   validating the aggregated list of users who meet the specification by determining if the aggregated list meets at least one criterion for anonymous aggregation; and
   if the aggregated list is validated as meeting the at least one criterion, triggering the action in the anonymous aggregation command to be taken in respect of the validated aggregated list of users who meet the specification.

2. A method according to claim 1, comprising:
   storing, in an event index, event information relating to events that have taken place concerning a user.

3. A method according to claim 2, wherein the generating an aggregated list of users comprises executing a query in the event index to retrieve the list of users who meet the specification in the anonymous aggregation command.

4. A method according to claim 1, wherein event information relating to events is stored in plural event indexes, and the generating an aggregated list of users comprises executing queries in the plural event indexes to retrieve the list of users who meet the specification in the anonymous aggregation command.

5. A method according to claim 4, wherein at least two of the event indexes are stored in a distributed manner in different nodes of a network.

6. A method according to claim 2, comprising executing a query in the event index in respect of the user of the user client device in order to validate the specification in the anonymous aggregation command for that user.

7. A method according to claim 2, comprising storing in the event index subject data concerning the subject matter of actions carried out by users.

8. A method according to claim 1, wherein the generating an aggregated list of users comprises:
causing a query to be issued to retrieve event information relating to events that have taken place concerning a user.

9. A method according to claim 8, comprising generating the aggregated list of users who meet the specification from responses received to the issued queries.

10. A method according to claim 8, comprising causing a query to be issued to retrieve event information relating to the user of the user client device in order to validate the specification in the anonymous aggregation command for that user.

11. A method according to claim 1, wherein the generating an aggregated list of users involves a list sharing method whereby lists of at least one of users, data and objects are stored in a distributed manner across a number of nodes of a network, and a list created by one node can be checked for common elements by another node without requiring that the other node can read the whole list.

12. A method according to claim 1, wherein the action to be taken comprises creating an object addressed to each of the users in the validated list of users.

13. A method according to claim 1, wherein the action to be taken comprises outputting an indication of the number of users in the validated list of users for receipt by the user client device that issued the anonymous aggregation command.

14. A method of triggering an action to be taken in respect of users whose data has been anonymised by aggregation, the method comprising a client-side device:
issuing an anonymous aggregation command for receipt by a server-side device, the anonymous aggregation command including:
a reference to the user on whose behalf the command is being issued; a specification of a set of users, the specification relating to user behavior; and an action to be taken by the server-side device in respect of users in an aggregated list of users who meet the specification and are validated as meeting at least one criterion for anonymous aggregation.

15. A method according to claim 14, comprising receiving at the client-side device data from the server-side device in respect of a validated list of users who meet the specification.

16. Apparatus comprising one or more server-side devices for anonymizing user data by aggregation, the apparatus providing a processing system constructed and arranged to:
receive at at least one server-side device an anonymous aggregation command from a user client device, the anonymous aggregation command including a specification of a set of users, the specification relating to user behavior, the anonymous aggregation command further including an action to be taken in respect of at least some of the users who meet the specification;
generate an aggregated list of users who meet the specification in the anonymous aggregation command;
validate the aggregated list of users who meet the specification by determining if the aggregated list meets at least one criterion for anonymous aggregation; and
if the aggregated list is validated as meeting the at least one criterion, trigger the action in the anonymous aggregation command to be taken in respect of the validated aggregated list of users who meet the specification.

17. Apparatus according to claim 16, the processing system being constructed and arranged to:
store, in an event index, event information relating to events that have taken place concerning a user.

18. Apparatus according to claim 17, the processing system being constructed and arranged to execute a query in the event index to retrieve the list of users who meet the specification in the anonymous aggregation command.

19. Apparatus according to claim 18, wherein event information relating to events is stored in plural event indexes, the processing system being constructed and arranged to:
generate an aggregated list of users by executing queries in the plural event indexes to retrieve
the list of users who meet the specification in the anonymous aggregation command.

20. Apparatus according to claim 17, the processing system being constructed and arranged to execute a query in the event index in respect of the user of the user client device in order to validate the specification in the anonymous aggregation command for that user.

21. Apparatus according to claim 17, the processing system being constructed and arranged to store in the event index subject data concerning the subject matter of actions carried out by users.

22. Apparatus according to claim 16, the processing system being constructed and arranged to cause a query to be issued to retrieve event information relating to events that have taken place concerning a user.

23. Apparatus according to claim 22, the processing system being constructed and arranged to generate the aggregated list of users who meet the specification from responses received to the issued queries.

24. Apparatus according to claim 22, the processing system being constructed and arranged to cause a query to be issued to retrieve event information relating to the user of the user client device in order to validate the specification in the anonymous aggregation command for that user.

25. Apparatus according to claim 16, the processing system being constructed and arranged such that the generating an aggregated list of users involves a list sharing method whereby lists of at least one of users, data and objects are stored in a distributed manner across a number of nodes of a network, and a list created by one node can be checked for common elements by another node without requiring that the other node can read the whole list.

26. Apparatus according to claim 16, the processing system being constructed and arranged to creating an object addressed to each of the users in the validated list of users.

27. Apparatus according to claim 16, the processing system being constructed and arranged to output an indication of the number of users in the validated list of users for receipt by the user client device that issued the anonymous aggregation command.

28. A client-side device for triggering an action to be taken in respect of users whose data has been anonymised by aggregation, the device comprising a processing system constructed and arranged to:

issue an anonymous aggregation command for receipt by a server-side device, the anonymous aggregation command including: a reference to the user on whose behalf the command is being issued; a specification of a set of users, the specification relating to user behavior; and an action to be taken by the server-side device in respect of users in an aggregated list of users who meet the specification and are validated as meeting at least one criterion for anonymous aggregation.

29. A client-side device according to claim 28, the processing system being constructed and arranged to carry out an action in respect of data concerning a validated aggregated list of users who meet the specification received from the server-side device.

30. A non-transitory computer-readable storage medium comprising a set of computer-readable instructions stored thereon, which, when executed by a processing system, cause the processing system to carry out a method according to claim 1.

31. A non-transitory computer-readable storage medium comprising a set of computer-readable instructions stored thereon, which, when executed by a processing system, cause the processing system to carry out a method according to claim 14.

* * * * *